United States Patent [19]

Santić et al.

[11] 4,067,245

[45] Jan. 10, 1978

[54] LEVER TRANSMISSION PARTICULARLY FOR LIFTING MEANS

[75] Inventors: Blaz Santić, Burgau; Otto Volz, Reisensburg, both of Germany

[73] Assignee: Karl Mengele & Sohne, Gunzburg, Germany

[21] Appl. No.: 600,069

[22] Filed: July 29, 1975

[30] Foreign Application Priority Data

Aug. 10, 1974 Germany .............................. 2438566

[51] Int. Cl.² ............................................ F16H 21/44
[52] U.S. Cl. ...................................................... 74/96
[58] Field of Search ...................................... 74/96, 25

[56] References Cited

U.S. PATENT DOCUMENTS

| | | | |
|---|---|---|---|
| 113,687 | 4/1871 | Nimmo | 74/96 |
| 929,801 | 8/1909 | Sperry | 74/96 |
| 1,594,463 | 8/1926 | Ledbetter | 74/96 |
| 2,534,093 | 12/1950 | Willard | 74/48 |
| 2,775,800 | 1/1957 | Ellms | 74/96 |
| 3,134,266 | 5/1964 | Wallace | 74/68 |

Primary Examiner—Samuel Scott
Assistant Examiner—Wesley S. Ratliff, Jr.
Attorney, Agent, or Firm—Toren, McGeady and Stanger

[57] ABSTRACT

In a lifting and tipping mechanism a lever drive unit includes two pairs of scissors arms with each pair pivotally mounted on an oppositely disposed leg of a U-shaped undercarriage, a swing mechanism is provided for guiding the movement of the scissors arms from a folded position on the undercarriage to an extended lifting and tipping position upwardly from the undercarriage. The swing mechanism consists of an elongated sliding guide in which a guide member, fixed to one end of one of the scissors arm of each pair is slidably displaced by a hydraulic linear motor. The sliding guide has a first part which extends parallel to the legs of the undercarriage in the folded position of the scissors arms and a second part which extends angularly upwardly from the first part. As the scissors arms open from the folded position, the guide member moves from the first part into the second part. The sliding guide can be formed in a single member or it can be made up of two separate members.

17 Claims, 7 Drawing Figures

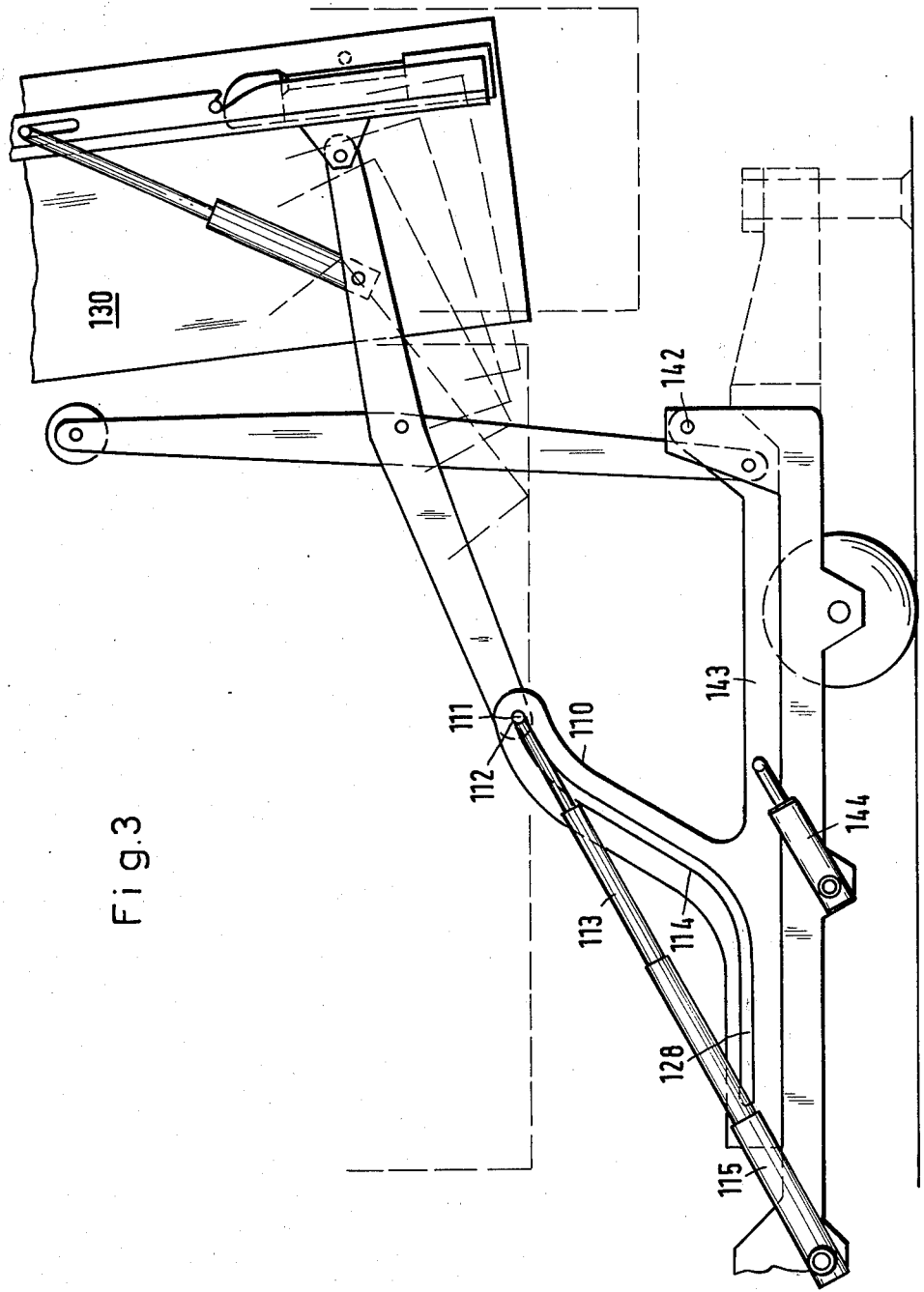

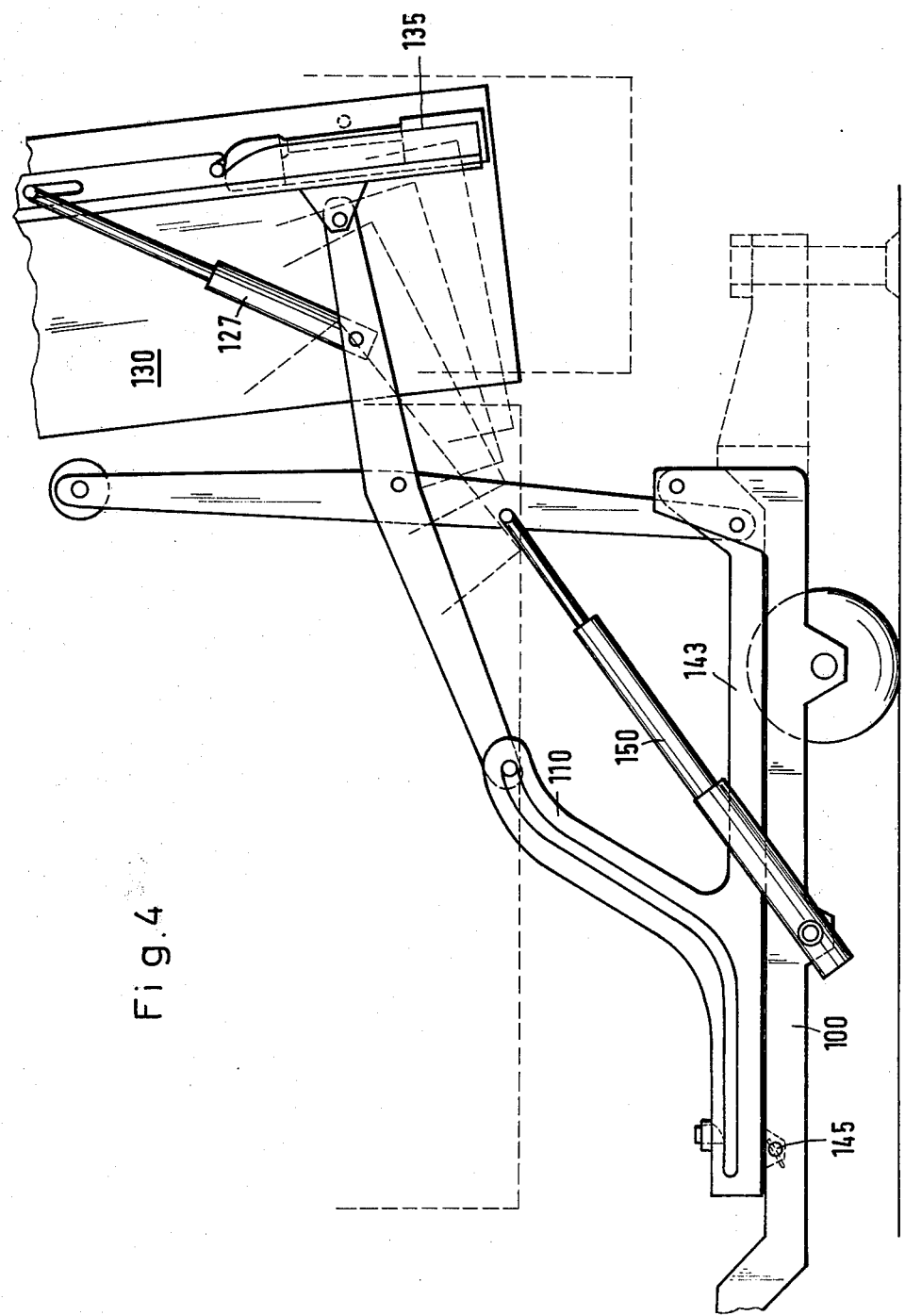

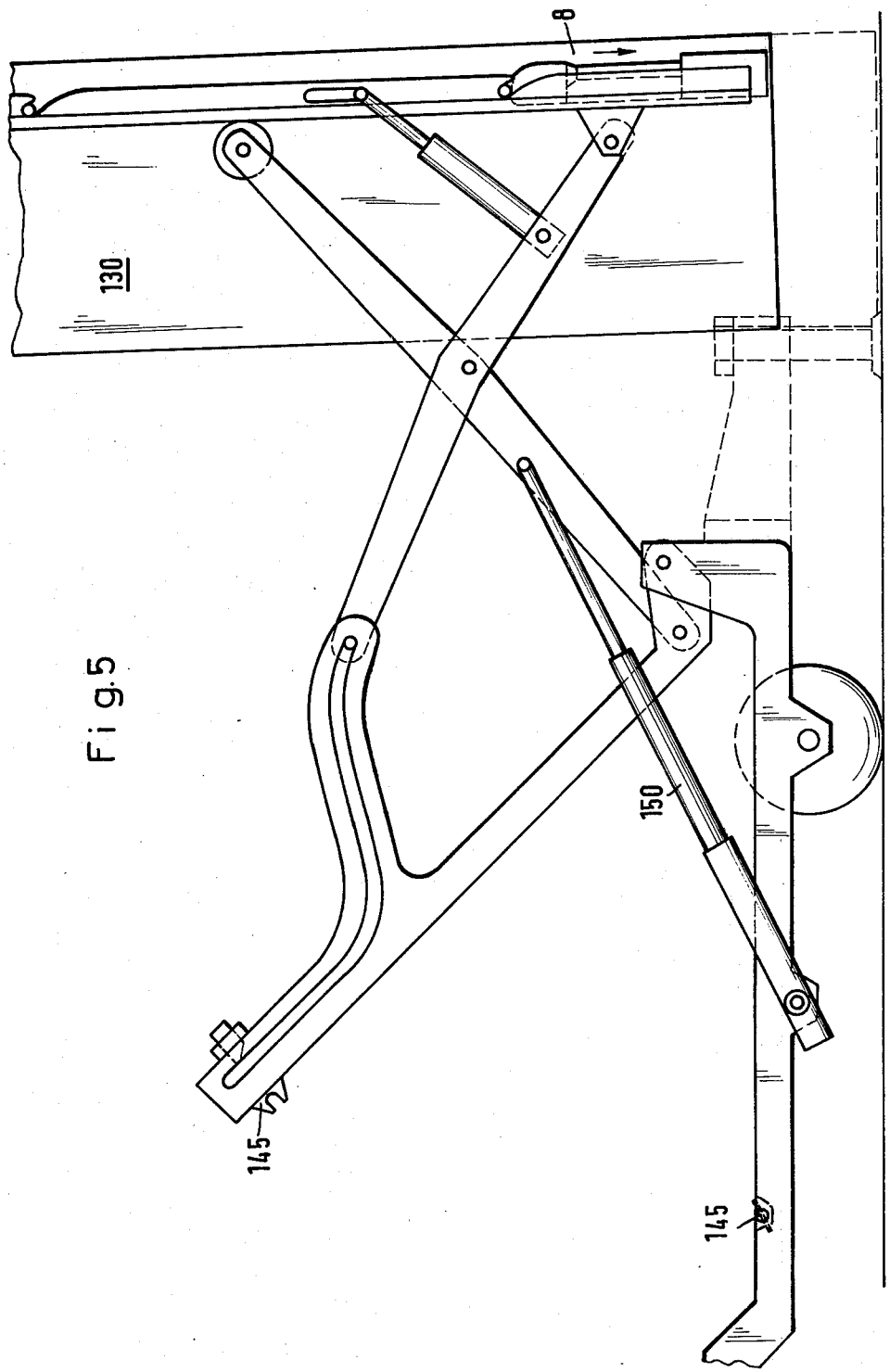

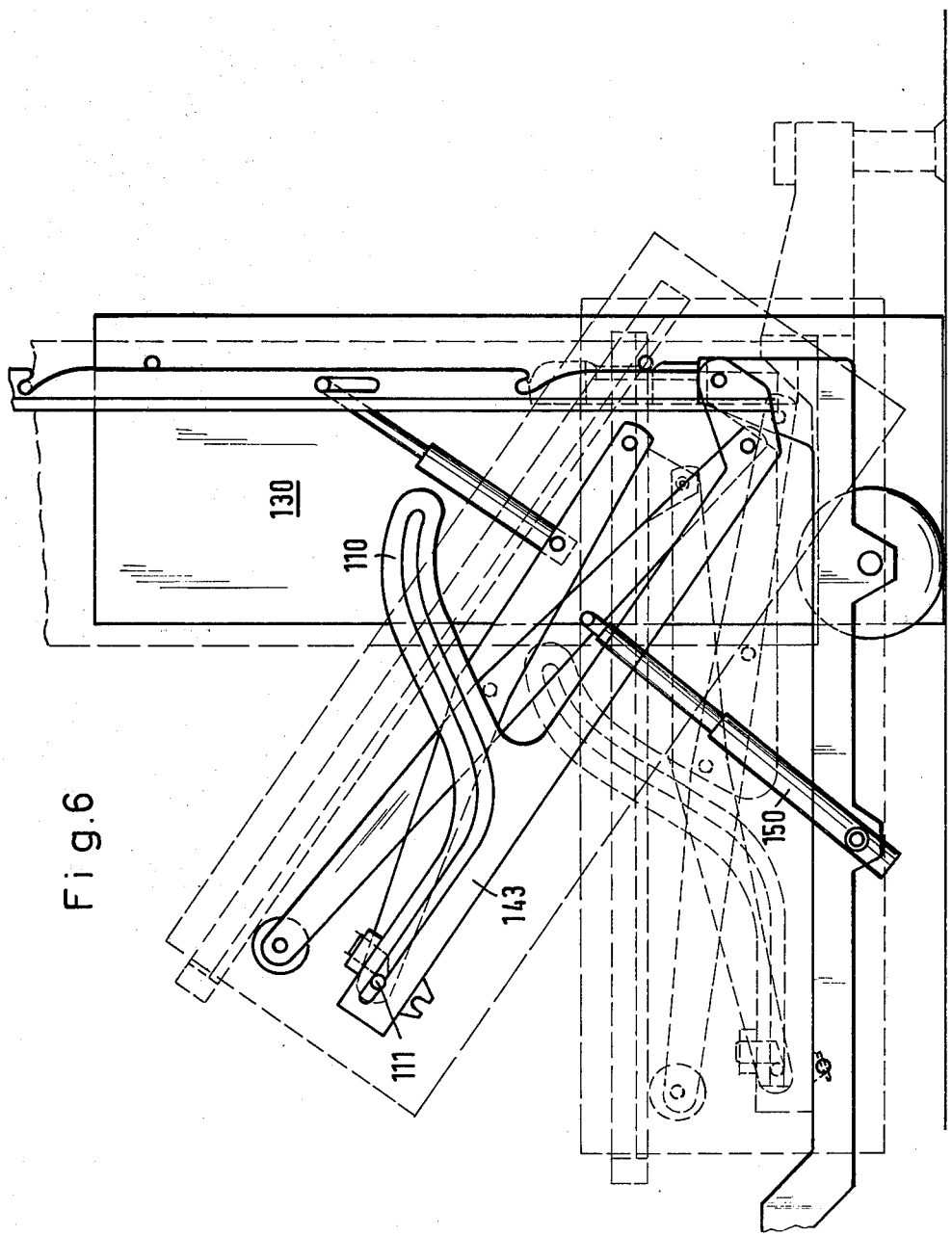

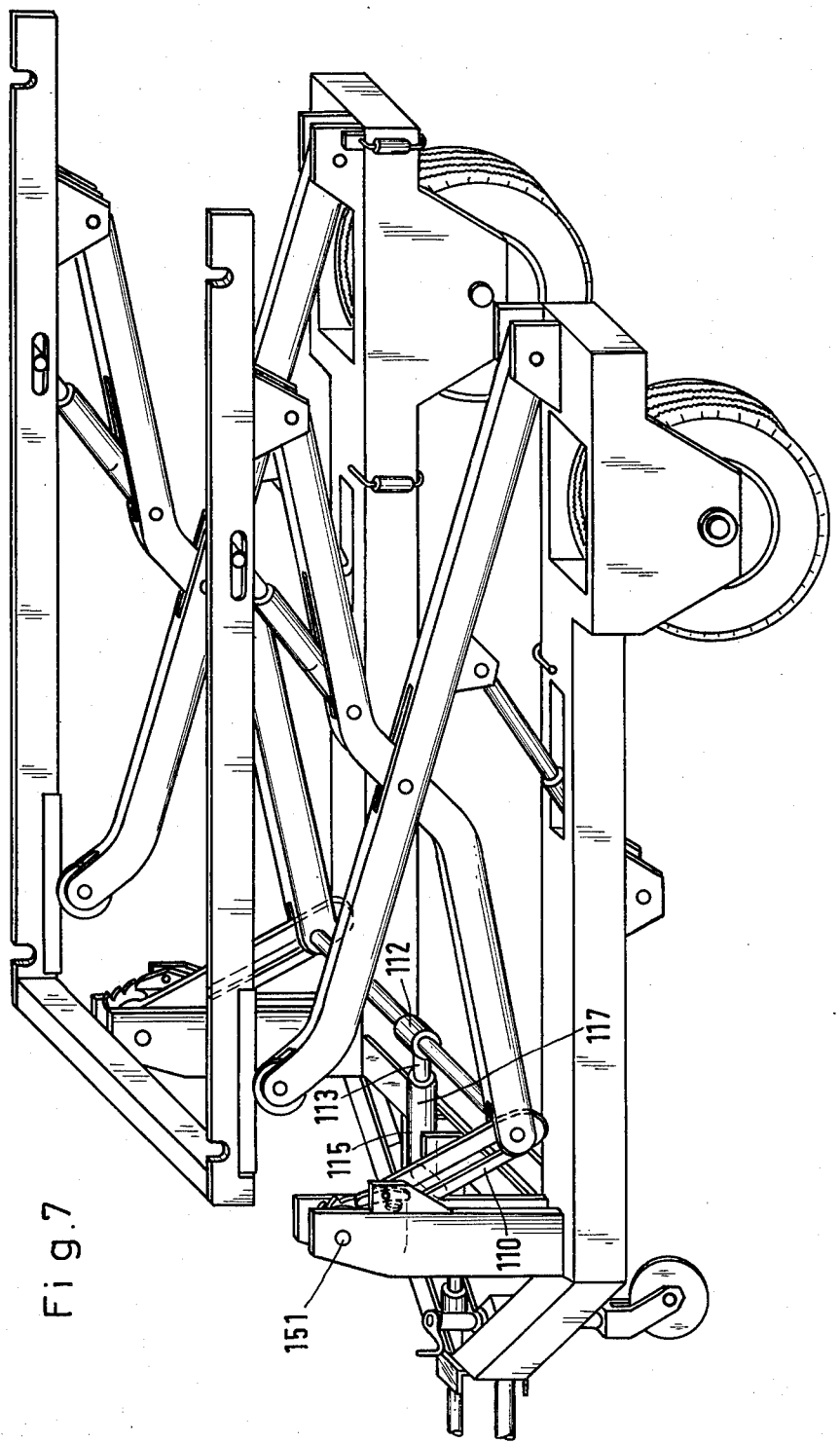

LEVER TRANSMISSION PARTICULARLY FOR LIFTING MEANS

This invention relates to a lever drive unit, particularly for lifting means, for example, of vehicles with a lifting and tipping mechanism, particularly for picking up alternating loads, using a forked supporting frame. Close to its free rear legs the forked supporting frame is held by two parallel swing arms, which are connected to the undercarriage by hinge joints and are provided with holding or locking elements for corresponding counter holding or counter locking elements. The swing arms are pivoted to the undercarriage by hydraulic lifting mechanisms and to the supporting frame by hydraulic tipping mechanisms. In the lever drive unit the swing arms are members of scissors-type lift rods in a manner known per se and the free upper ends of the scissors arms form an upwardly free support for the supporting frame in order to tip the supporting frame about the hinge joints. In ordery to carry out a vertical shearing to tipping stroke the hydraulic lifting and tipping mechanisms can be acted upon separately and for carrying out combined lifting and tipping motions they can be acted upon jointly. The other scissors arm is connected to the vehicle or to an auxiliary tipping support thereof by way of a guide member in a slide or swing element, the guide member bringing about the alignment.

This kind of sliding pin drive is also quite generally used in various modifications, for example, in the form of two-stroke drives as in the described scissors rods for lifting means, for dredgers, cranes and the like.

Heretofore, the function of lever drive units was restricted to converting e.g. circular motions transmitted to the drive into straight-lined motions or vice versa.

For lifting means, which, for example, in the case of container vehicles, lift the loads from the ground, the scissors-type levers must have, for this purpose, complete symmetry of all the scissors members about the scissors centre, so that the lifting motions transmitted to the scissors system or the motion of the load which is derived from the swinging circular motions of the scissors lever ends are directed upwardly in a straight line. Horizontal sliding guides or swing arms (intermediate members), which must be provided on the support on the one hand and on the carrying means or container on the other, usually serve as guide means for aligning the scissors lever ends. Because of the required parallelism of the alignment of the sliding bearing on the support and on the carrying means or container expensive guides on the loads, for example, for change containers, are required.

Another disadvantage of the known scissors-type lever systems is the fact that owing to the gradual lifting of the load an increasingly smaller support surface is covered during the alignment of the scissors lever ends which are directed toward the interior of the scissors. The stability of the lifting means thus is impaired.

In order to carry out tipping motions of the carrying means simultaneously, additional expensive devices are usually required for the known lever drives, particularly for the scissors-type lever systems. Even with these additional devices the tipping of loads was not possible heretofore not even to the required tipping positions of approximately 45°, particularly not at higher tipping positions, not to mention tipping or setting down or picking up the loads outside the effective lifting range.

Thus, for example, a lifting and tipping device is known (see laid-open German Specification No. 1 804 765) in which the scissors lever connecting link is constructed in the form of a slide guide in the locking device in the scissors lever centre.

The lifting motion is carried out in this position. Only after releasing the locking device, which can be achieved only upon locking the sliding scissors lever end in detents (which are also provided) in order to absorb the sliding pressure, can be tipping motion be initiated by a linear motor. This is cumbersome and time-consuming.

Since in this kind of known lifting means hydraulic linear motors are usually used for raising the load, the additional mechanical locking devices are also required in order to secure the raised load. Attempts were also made to design the slide members themselves as locking device. This requires complex and expensive constructions in order to obtain the locking and unlocking motions under load.

Therefore, it was not possible to form a plurality of detents for the purpose of a more sensitive locking operation.

The same difficulties are also encountered in other kinds of devices, as for example, according to the laid-open German Specification No. 1 904 830. In this case, the entire tipping mechanism, by means of which the entire system of scissors rods with the load is lifted, is arranged on one side on an auxiliary frame by means of swing brackets. On the other side said auxiliary frame is in turn secured on the frame by a locking device. The lifting rods with the load are raised up and locked in notches of the slide members. The locking connection of the frame is then detached, whereupon the scissors can be swung with the load about the fulcrum of the swing brackets.

Apart from the expenditure, the operation of these lifting and tipping devices is cumbersome and time-consuming. Thus, with the discussed devices it is not possible either to combine the lifting and tipping operation, i.e. a combination which is often desirable in order to accelerate the sliding of the load.

In another lifting means of this kind of vehicle (French Pat. No. 1 324 375) it actually is possible to combine the two operations. However in order to pick up the load parallel to the ground, this operation requires an absolute synchronism of the lifting and tipping devices and a particularly precise conformity of the rods on both sides and constant attention must be paid to the operation so that the tipping operation is not initiated unintentionally.

Since the lifting and tipping operations change over into one another in an uncontrolled manner, it is difficult to carry out aimed motions with this kind of lifting means.

Therefore, the motional actions in the known lever drive units are greatly restricted and this also applies to dredging tools and the like. Moreover the effective range of the known lever drive units have narrow limits within the lifting range. Picking up or transferring loads outside these narrowly confined effective ranges is not possible so that, as lifting means of container vehicles, said known lifting drive units do not permit additional uses, which alone would justify the investment in such a vehicle.

Thus, heretofore there remained no other choice than picking up the change container vehicles in order to tip or load them by means of additional lifting or tipping vehicles and thus to tip or unload them (see Landtechnik 73, No. 20, page 533).

Therefore, it is the aim of the invention to create a lever drive unit, particularly for lift trucks and tippers, with which, for example, loads, tools and the like can be handled in a larger effective range (i.e., a range exceeding the undercarriage) with unlimited adjustment to any operating position and any motion and by means of which loads can be picked up and can be brought into the loading position at a tipping position of at least 90°, particularly on the ground outside the vehicle.

The aim of the invention is achieved essentially by a lever drive unit, particularly a lifting means, which, for example, in the preferred embodiment of a lift-truck and tipper, lies in that a guide member is supported in a sliding guide of the swing element either exclusively or for the alignment additionally in a slide element, which has the shape of a fork opening towards the inside of the scissors, or in the sliding guide of a slide element having an extension with sliding guide, said extension being bent upwardly and towards the inside of the scissors.

The lever drive unit according to the invention can be used in many ways. In its preferred use for lift-trucks and tippers not only can the picked-up loads be put readily on the vehicle in the most favorable position for shipping, lifting and tipping, but they can also be picked up from the ground outside the vehicle as well as from platforms or from planks and set down thereon.

As stated hereinbefore, this was often attempted but the problem was never solved to this extent with such simple means.

In an embodiment of the invention the slide element, which has an extension, can be arranged on an auxiliary tipping support carrying the scissors. The auxiliary support rests on the longitudinal members of the undercarriage and on the rear end of the longitudinal member it is pivoted to pivot bearings aligned at right angles to the axis of the longitudinal member and held on the undercarriage by detachable holding means, for example, a double-acting linear motor. With this relatively simple construction system-bound lifting and tipping motions can also be carried out by guiding and detaching by more than 90°.

In another embodiment in which the swing element forms the sliding guide for the guide members of the scissors, stopping means are assigned to the swing element in order to hold it in a predetermined position, for example, a double-acting linear motor, so that any conceivable tipping or unloading position can be set in a particularly large effective range.

The guide member is suitably connected directly to the lifting mechanism. In a further development of this device the stationary portion of the lifting mechanism can be rigidly connected to the slide element so that the lifting device, for example, a hydraulic linear motor, is protected against buckling.

For initiating specific motions means for fixing the guide member, for example, detachable detents, can be assigned to it in the guides.

In order to fix the end point of the lifting motion and initiate the tipping motion, the slide element, or the slide element provided with an extension, can be slidingly arranged on the frame or on the auxiliary tipping support in a simple manner, for example, by a spindle.

According to the invention the guide of the extension is so constructed that it describes a curve corresponding to the turning radius of the guide member. With these arrangements a variety of motions can be combined. They are explained hereafter in greater detail in the description of the drawings.

The invention is explained and described in more detail by means of a number of practical examples with reference to the drawings.

FIG. 3 shows a modified crank gear of a container vehicle;

FIG. 4 shows the modification of the vehicle according to FIG. 3;

FIG. 5 shows a container vehicle according to FIG. 4 in the loading position;

FIG. 6 shows the container vehicle according to FIG. 4 in the unloading and pick-up positions within the undercarriage in the ground plane and FIG. 7 shows a representation of a container vehicle according to the invention in perspective view.

In all the Figures the lifting and tipping mechanisms according to the invention is arranged on a trailer. Of course, self-driving vehicles are even more suitable for this purpose since the vehicles according to the invention are capable of carrying out many functions, which were reserved heretofore for stacker trucks, cranes and the like, in addition to the shipping functions.

Figure 1:
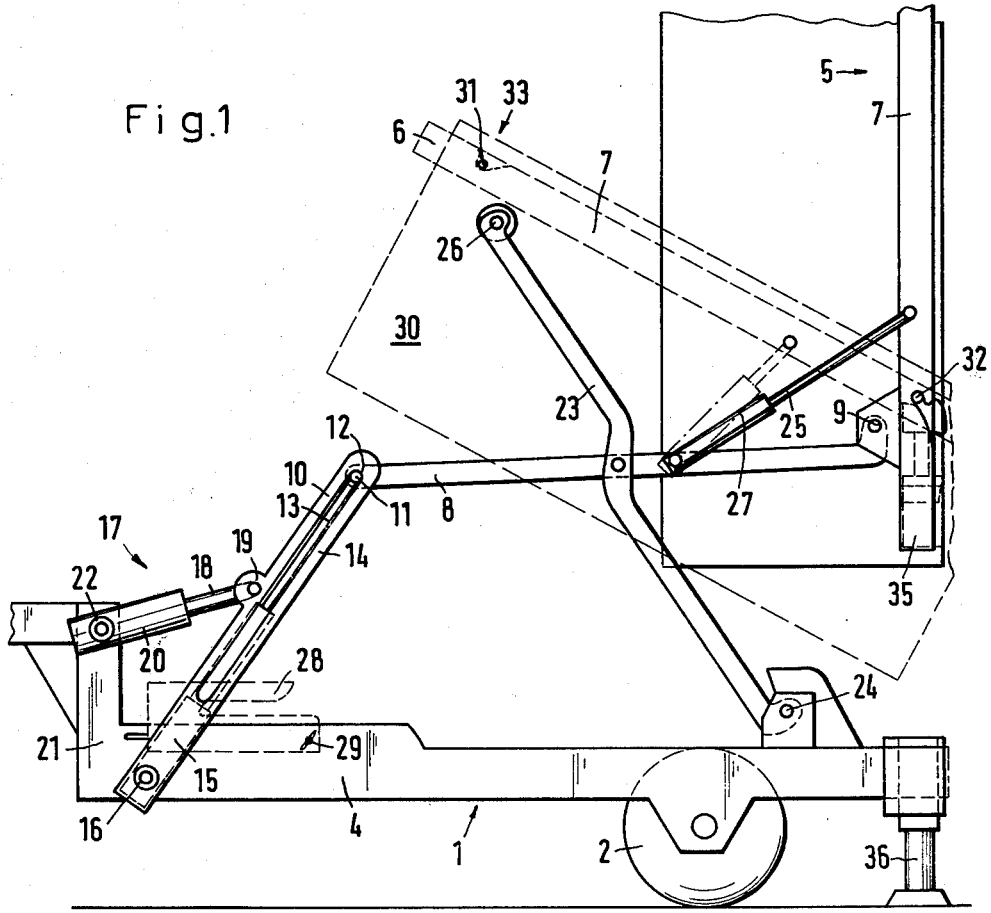
FIG. 1 shows the lever drive unit (scissors) of a container vehicle in the lifting and tipping positions.

The reference numbers in FIG. 1 which refer to the vehicle parts and those referring to the lifting and tipping device correspondingly apply to all the Figures if the embodiments are the same.

For modified embodiments reference members having the prefix 100 are used in the drawings.

The undercarriage of the trailer shown comprises substantially a frame 1, a chassis 2 and a twobar (not shown here). The frame 1 is U-shaped. The side membes 4 are arranged at right angles to the transverse spar 3 of the frame 1. The supporting frame 5 is also U-shaped. Longitudinal members 7 are arranged on the transverse spar 6 of the supporting frame 5. Scissors arms (swing arms) 8 are pivoted with their free ends to hinge brackets 9 of the supporting frame 5.

Figure 2:
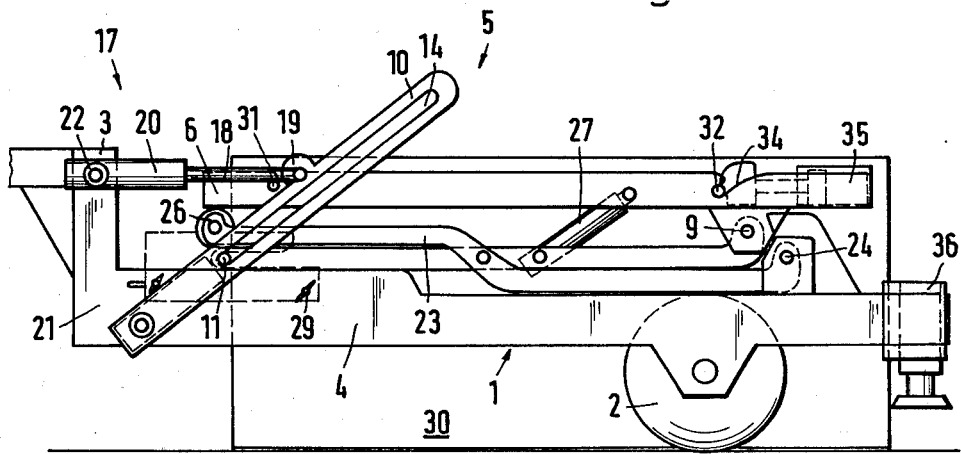
FIG. 2 shows the container vehicle according to FIG. 1 in position for picking up the container.

The lower free ends of the swing arms 8 are supported in accordance with the invention by swing elements 10 with bolt 11 (guide member) and connected to a piston rod 12 of a piston 13 and guided therewith in a sliding guide 14 of the swing elements 10 (FIG. 2).

The cylinders 15 of hydraulic linear motors are rigidly connected to the swing arms 10, and, with them, they are supported on the frame 1 by means of hinges 16. The double-acting hydraulic linear motors 17 are secured with a piston 18 to the swing elements by means of hinge 19 and with a cylinder 20 to brackets 21 of the frame 1 by means of hinge 22.

Scissors arms 23 are pivoted to scissors arm 8. At their lower ends the scissors arms 23 are pivoted to hinge joints 24 of the frame 1.

Rolls 26 for supporting the supporting frame 5 are arranged on the other end of the scissor arms 23.

In FIG. 2 the vehicle is shown in the position for receiving a change container 30.

In this position the U-shaped frame 1 along with the supporting frame 5 was brought in, i.e., in front of the detent on the container side up to the transverse spar 6.

In the position shown lateral support bolts 31 and 32, which are provided in front of and behind the change container 30, are above the lock grooves 33 and 34 provided on the longitudinal members 7 of the supporting frame.

If the container is raised by actuating the linear motor 13/15, then the locking means described, which are provided with grooves, are locked. A hydraulic locking and lowering device 35 according to the invention then secures the position of the support bolts 32 within the lock grooves 33. The scissors rods with their guide member are guided in a slide element 28 until it is released at the open end thereof. The detents 29 of the slide element can be moved upon releasing said slide element. The pull-out point thus is adjustable.

As indicated in FIG. 1, because of the free scissors rods the supporting frame 5 can be swung further about the supporting frame hinge 26 by the hydraulics of the linear motor 27. The intermediate position is shown in dotted lines and the tipped position in solid lines.

In the vertical tipped position shown in FIG. 1, the container can be lowered with the locking and lowering device from the indicated height, for example, to a platform placed thereunder or even on the ground, after the change container 30 has been brought into a position favourable for setting down, by jointly extending the linear motors 12, 13, 15 and 27.

The hydraulic supports 36 secure the vehicle against overturning. According to the invention, a loading point beyond the vehicle can be determined only by adjusting the linear motor 17 and the load can be tipped and unloaded by means of the linear motors 27 and 35. Of course, the linear motor 12, 13, 15 which can also be constructed as a telescopic cylinder, can also so control the tipping operation that load can be tipped further than 90°.

The container is returned from the tipping position with the aid of the double-acting linear motor 17. By adjusting the distance of the guide members 11 from the hinge joints 16 and from the position of the linear motors 17 any tipping and loading position can be adjusted in a simple manner in a particularly large range or carried out with a programming device. Of course the guide members 11 can also be connected to one another by a shaft so that only one linear motor is required for adjusting the swing elements 10 (FIGS. 7-117).

Modified embodiments are shown in the FIGS. 3 to 6. In the modified embodiments the guide members 111 in extensions 110 are rigidly guided in a predetermined path (sliding guide) 114 (which is continued by a slide element 128 for the lift of the scissors) instead of the continuously adjustable positioning of the swing element 10 with the guide member 11. Depending on the initial position of the linear motor 113/115 the change container 30 is brought into the positions shown as dotted lines and can then be brought into a desired loading or set-down position by a double-acting linear motor 144, which actuates an auxiliary tipping support 143. The construction according to the FIGS. 4 to 6 is different in that the auxiliary tipping support 143 is detached from the frame 1 by means of a remote-controlled detent 145.

For the entire operation only one linear motor 46 is required. However, in this case it must be a double-acting one. In the practical example with the detent 145 the change container 30, which, according to FIG. 4, is in the raised position, is brought into the lowered position and by actuating the linear motor 35 in the indicated direction, it is slowly lowered to the ground after the motor has been successively brought into all the positions of pick-up, loading to setting down, as shown in FIG. 6.

We claim:

1. A lever drive lifting unit comprising an undercarriage having a pair of laterally spaced legs each having a first end and a second end and a transverse spar interconnecting the first ends of said legs, two pair of pivotally connected scissors arms with one pair of said scissors arms mounted on and extending along each of said legs, each said pair of scissors arms comprising a first scissors arm and a second scissors arm each having a first end and a second end with said first and second scissors arms being pivoted together intermediate the first and second ends thereof, in each said pair of scissors arms said first scissors arm and second scissors arm are displaceable from a folded position resting on the associated said leg of said undercarriage to a plurality of lifting positions with said first and second scissors arms being pivotally displaced upwardly from the folded position, means for pivotally displacing said arms upwardly from the folded position on said undercarriage, said first ends of said first and second arms being located adjacent the first end of the associated said leg of said undercarriage and said second ends being located adjacent the second ends of the associated said leg of said undercarriage when said scissors arms are in the folded position, a supporting frame for receiving alternating loads supported by at least said first scissors arms, at least one swing mechanism mounted on said undercarriage adjacent the transverse spar end thereof, said swing mechanism having an elongated sliding guide formed therein, a guide member on each said first scissors arm adjacent the first end thereof and slidably positionable within said sliding guide, said means for pivotally displacing said scissors arms comprising a first telescopically extendable member for effecting the displacement of said guide member within said sliding guide as said pairs of scissors arms are moved from the folded position to the lifting positions for thereby lifting said supporting frame, and a second telescopically extendable member for pivotally displacing said supporting frame relative to said first scissors arms.

2. A lever drive lifting unit, as set forth in claim 1 wherein said undercarriage is U-shaped and the second ends of said legs of said undercarriage are free ends, and said sliding guide having a first part extending in parallel relation with the associated leg of said undercarriage when said scissors arms are in the folded position and a second part disposed angularly to said first part.

3. A lever drive lifting unit, as set forth in claim 2, wherein said first part has a first end and a second end with the first end of said first part located closer to the transverse spar end of said undercarriage than the second end thereof and said second part extending from the second end of said first part generally toward the opposite end of said undercarriage from the transverse spar end thereof.

4. A lever drive lifting unit, as set forth in claim 3, wherein said swing mechanism comprises a swing element and a slide element, said sliding guide located in said swing element and in said slide element, said slide element forming the first part of said sliding guide and said swing element forming the second part of said sliding guide.

5. A lever drive lifting unit, as set forth in claim 3, wherein said first telescopically extendable member comprises a hydraulic linear motor including a hydraulic cylinder and a piston rod telescopically mounted in said hydraulic cylinder, said hydraulic cylinder pivotally connected to said undercarriage and said piston rod connected to said guide member for displacing said guide member through said sliding guide.

6. A lever drive lifting unit, as set forth in claim 5, wherein said extension is pivotally connected to said undercarriage at the free ends of said legs of said undercarriage and said means for pivotally displacing said arms comprises a hydraulic linear motor pivotally attached to said undercarriage and attached to said extension.

7. A lever drive lifting unit, as set forth in claim 4, wherein said guide element is secured to said undercarriage and includes a slot forming the first part of said sliding guide, said slot having a first end closer to the transverse spar end of said undercarriage and a second end spaced toward the opposite end of said undercarriage from the transverse spar end, the first end of said slot being closed and the second end of the slot being open so that said guide member can be displaced from said first part of said sliding guide for continuing movement through said second part of said sliding guide formed in said swing element.

8. A lever drive lifting unit, as set forth in claim 7, wherein detents are arranged to secure said slide element to said undercarriage and said detents being displaceable so that said slide element can be displaced relative to said undercarriage in the direction of said legs thereof.

9. A lever drive lifting unit, as set forth in claim 8, wherein said swing element is pivotally secured to said undercarriage at a location adjacent the transverse spar end thereof and extending angularly upwardly from said undercarriage toward the free ends of said legs thereof, said sliding guide in said swing element comprising a closed ended elongated slot, said first telescopically extending member comprises a hydraulic linear motor secured to said swing element, said hydraulic motor including a hydraulic cylinder and a piston rod telescopically mounted in said hydraulic cylinder and extending in the elongated direction of said slot in said swing element, said piston rod is connected to said guide member for displacing said guide member in the elongated direction of said slot.

10. A lever drive lifting unit, as set forth in claim 9, wherein said means for pivotally displacing said arms further comprises a third telescopically extendable member which is a hydraulic linear motor comprising a cylinder and a piston rod displaceable from said cylinder, said cylinder being pivotally attached to said undercarriage at the transverse spar end thereof and said piston rod being pivotally attached to said swing element.

11. A lever drive lifting unit, as set forth in claim 10, wherein said supporting frame is pivotally connected to said first scissors arm of each said pair of scissors arms at the second end of said first scissors arm, and said second telescopically extendable member for pivotally displacing said supporting frame is a linear motor comprising a cylinder and a piston rod displaceable from said cylinder, said cylinder pivotally mounted on said first scissors arm and said piston rod pivotally connected to said supporting frame.

12. A lever drive lifting unit, as set forth in claim 11, wherein said supporting frame has lock grooves therein for receiving support bolts on a container, and means positioned on said supporting frame for locking the support bolts of a container with said lock grooves.

13. A lever drive lifting unit, as set forth in claim 1, wherein said undercarriage is U-shaped with the second ends of said legs being free ends, said swing mechanism comprises an extension secured to said undercarriage and extending thereon in the direction of said legs of said undercarriage, said sliding guide formed in said extension and having an elongated slot comprising a first part extending in the folded position of said scissors arms in parallel with said legs of said undercarriage and a second part forming a continuation of said first part and extending angularly upwardly from said first part and in the direction toward the free ends of said legs of said undercarriage.

14. A lever drive lifting unit, as set forth in claim 13, wherein said first telescopically extendable member comprises a hydraulic linear motor including a hydraulic cylinder and a piston rod telescopically mounted in said hydraulic cylinder, said hydraulic cylinder pivotally connected to said undercarriage at a position intermediate the ends of said legs thereof and said piston rod connected to said scissors arm, said second scissors arms are each pivotally connected to a different said leg of said undercarriage at the free end of said leg and the connection of said second scissors arms to said piston rod being located between the end of said second scissors arm pivotally connected to said undercarriage and the pivotal connection of said second scissors arm to said first scissors arm.

15. A lever drive lifting unit, as set forth in claim 14, wherein said supporting frame is pivotally connected to said first scissors arm at the opposite end thereof from said guide member, and wherein said second telescopically extendable member comprises a hydraulic linear motor pivotally connected to said first scissors arm and connected to said supporting frame.

16. A lever drive lifting unit, as set forth in claim 13, wherein said extension is pivotally connected to said undercarriage at the free ends of said legs thereof and means on said undercarriage for releasably securing said extension to said undercarriage.

17. A lever drive lifting unit, as set forth in claim 9, including a shaft extending parallel and adjacent to said transverse spar of said undercarriage, said guide member associated with each of said first scissors arms being attached to the opposite ends of said shaft, and said first telescopically extendable member which effects the displacement of said guide member comprising a hydraulic linear motor including a hydraulic cylinder mounted on said transverse spar of said undercarriage intermediate the legs of said undercarriage and a piston rod displaceable from said hydraulic cylinder connected to said shaft intermediate its ends.

* * * * *